Patented Jan. 13, 1925.

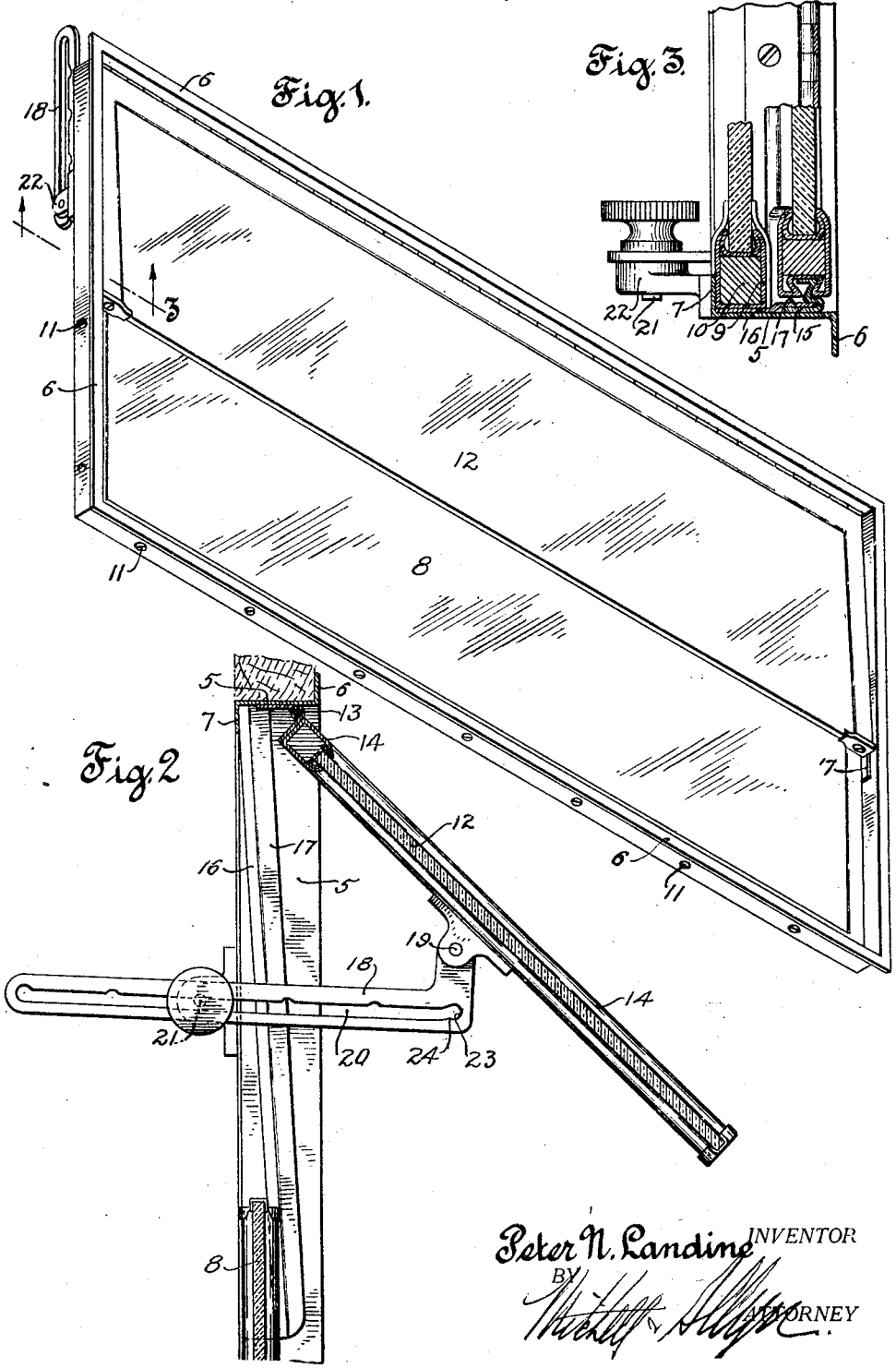

1,522,636

UNITED STATES PATENT OFFICE.

PETER N. LANDINE, OF MILFORD, CONNECTICUT.

WINDSHIELD.

Application filed March 7, 1922. Serial No. 541,754.

*To all whom it may concern:*

Be it known that I, PETER N. LANDINE, a citizen of the United States of America, residing at Milford, Connecticut, have invented a new and useful Windshield, of which the following is a specification.

My invention relates to a windshield construction and is particularly adapted for application to so-called closed cars.

It is an object of my invention to provide a cheap yet serviceable windshield which may be easily and securely held on an automobile.

It is a more specific object to provide a windshield frame which may be formed of sheet metal and which will be sufficiently rigid for all practical purposes.

It is a further object to provide a sheet metal windshield frame having means at one side to position the panels in the frame and means at the opposite side to position the frame in the opening in the automobile.

It is another object to provide means for holding the movable panel in closed position and which will extend substantially flatwise of the windshield when the movable panel is in that position so as not to obstruct the passage within the car.

In the preferred form of my invention there is provided a sheet metal frame having a peripheral outstanding flange extending all around the front side of the frame. A similar but inwardly directed flange extends completely around the rear side of the frame. A fixed panel member is inserted in the frame from the front side and abuts against and is positioned by the inwardly extending flange on the rear side of the frame. A movable panel is hinged to the frame and a link is pivotally attached to the movable panel and is adjustably held by means upon the inside of the car when the windshield construction is in place. The movable link and its pivot point are so designed and proportioned as to cause the link to extend substantially flat along the frame when the movable panel is in closed position.

In the drawings, which show for illustrative purposes only, a preferred form of my invention—

Fig. 1 is a perspective view of a windshield as viewed from the front.

Fig. 2 is an enlarged vertical sectional view of the upper part of the construction.

Fig. 3 is an enlarged fragmentary section taken substantially in the plane of the line 3—3 of Fig. 1.

In said drawings, 5 indicates the enclosing frame of the windshield and this frame is preferably formed of sheet metal. Extending around one side, preferably the outer side, is a peripheral outwardly extending flange 6. A similar peripheral inwardly extending flange 7 is formed around the inside of the frame. A rectangular frame such as shown may be conveniently formed of four sections mitered at the corners and welded. It will be seen that the main frame portion 5 and the two flanges 6—7 form a cross section of substantially Z shape, this section serving to resist strains in all directions and to afford substantial rigidity to the frame.

A fixed panel 8 may be secured in the lower portion of the frame. In the form shown the panel 8 is surrounded on three sides by means of a substantially rectangular tube or border frame 9, which in this disclosure is hollow. If desired, filler pieces of metal or other material 10 may be inserted in the frame or border members 9 to afford additional rigidity and into which the securing means such as the screws 11—11 may take. The panel 8 may be slid into the frame from the front side and abuts against the flange 7 so as to be positioned thereby.

The movable panel, such as 12, may be hinged to the upper portion of the frame 5 as indicated at 13. The movable panel 12 may be enclosed in a border or frame member 14 which may be similar to the enclosing frame or border on the fixed panel. The movable panel carries a tongue 15 at the two opposite sides thereof. A sealing plate 16 is secured to the frame 5 in any suitable manner and is provided with an offset portion 17 which is spaced away from the frame 5, so that the tongue 15 which is preferably of such size as to interfit with the offset portion 17 may pass between that portion and the adjacent part of the frame 5. This interfitting or interlocking feature at the side provides a tight joint which effectively prevents rain and wind from passing through. In the present disclosure the fixed panel 8 at its upper end fits between the flange 7 and the offset portion 17 of the sealing plate.

A link 18 at each side of the movable panel is pivoted thereto as at 19. Secured to the frame 5 or to any other suitable part of the automobile preferably to the flange 7 are means for holding the link in various positions of adjustment in order to hold the movable panel in predetermined positions. In the specific form shown the link is slotted as at 20 and a screw or clamping member 21 passes through the slot 20 and takes into the bracket 22 on the flange 7. It will be readily seen that when the movable panel is moved to a desired position the screw may be clamped down so as to engage the link 18 and hold the movable panel in the predetermined desired position. It is desirable when the movable panel is in closed position to have the link 18 in an out of the way position, and for that reason I have so designed the parts as to cause the link to lie substantially flat along the frame when the movable panel is closed. As indicated, the pivot point 19 of the link is offset relatively to the slot 20 or path of movement of the screw along the link. When the movable panel is closed, it will be apparent that the link will lie out of the way and substantially flat along the windshield frame as indicated in Figs. 1 and 3. The distance between the pivot 19 and the adjacent end of the slot 20 is such that this desirable result may be accomplished. When the swinging panel is in closed position it will be seen that the pivot 19 and the adjusting member 21 will lie in a plane at substantially right angles to the swinging panel and any force tending to swing the panel 12 outwardly will be transmitted to the pivot 19 and the force thus exerted by the pivot 19 will pass approximately through the adjusting member 21. Since the opposite forces thus exerted by the pivot 19 and the adjusting member 21 will be in a direction at right angles to the slot 20 there will be no tendency to swing the link and the swinging panel will thus be held in closed position even if the adjusting member is not tightly screwed up. In that portion of the slot which engages the clamping screw when the movable panel is in closed position, I have indicated a depression 23 bounded on one side by a projection 24. Obviously when the movable panel is in closed position, the clamping screw 21 will snap over the projection 24 and into the depression 23 and will serve to hold the movable panel in closed position even without drawing up on the clamping screw.

A windshield frame as described will possess the requisite rigidity even when formed of comparatively light sheet metal. The panel members however serve to brace and strengthen the frame substantially.

The form of windshield disclosed may be assembled at the factory and shipped ready for use. To apply the construction to an automobile all that is necessary is to insert the frame in the opening provided in the car until the outwardly projecting flange abuts the edge of the opening after which the frame is secured in place.

While I have disclosed one specific form of my invention, I wish it understood that modifications may be made within the scope of the invention as defined in the appended claims.

I claim:

1. In a windshield, a sheet metal frame adapted to fit an opening in an automobile, an outwardly extending flange on one side of said frame and an inwardly extending flange at the other side, said outwardly extending flange serving to abut the edge of the opening in an automobile for positioning the frame therein, a swinging panel in said frame, means secured to the inwardly extending flange on said frame and coacting with said swinging panel for holding the latter in various positions of adjustment, a pair of strips secured in said frame and having offset portions spaced from the inside of said frame, said swinging panel having a pair of tongues spaced from the edges thereof and interlocking with the offset portions of said strips when the swinging panel is in closed position, and a fixed panel in said frame positioned between the inwardly extending flange on the frame and the rear of the offset portions of said strips for positioning said fixed panel in said frame.

2. In a windshield, a frame, a swinging panel hinged to said frame, an adjusting member carried by said frame, a link pivoted to said swinging panel and movable along said adjusting member, the pivot point of said link and swinging member being out of alignment with the path of movement of the link along the adjusting member, whereby when the swinging member is in closed position the link will lie substantially flat along the frame and the axis of the pivot and the adjusting member will lie in a plane at substantially right angles to the swinging panel, and the direction of force exerted on the pivot when the swinging panel is forced outwardly will approximately pass through the axis of the adjusting member.

3. In a windshield, a frame, a swinging panel hinged to said frame, an adjusting member carried by said frame, a link pivoted to said swinging panel and having a slot therein fitting over the adjusting member, the pivot point of said link and swinging panel being offset to one side of the slot in the link, whereby when the swinging member is in closed position the link will lie substantially flat along the frame and the axis of the pivot and the adjusting member will lie in a plane at substantially right angles to the swinging panel, and the direction of force exerted on the pivot when the swinging panel is forced outwardly will approximately pass through the axis of the adjusting member.

4. In a windshield, a frame, a swinging panel hinged to said frame, an adjusting screw carried by said frame, a link pivoted to said swinging panel and having a slot therein fitting over the screw, the pivot point of said link and swinging member being offset to one side of the path of movement of the screw and slot whereby when the swinging member is in closed position the link will lie substantially flat along the frame, said slot having a shoulder therein to engage the adjusting screw when the swinging member is in closed position to hold the latter in said closed position.

PETER N. LANDINE.